(12) United States Patent
Fornal et al.

(10) Patent No.: US 10,657,074 B2
(45) Date of Patent: May 19, 2020

(54) CONNECTING AN EXTERNAL PHY DEVICE TO A MAC DEVICE USING A MANAGEMENT DATA INPUT/OUTPUT INTERFACE

(71) Applicant: Intel Corporation, Santa Clara, CA (US)

(72) Inventors: Jakub Fornal, Gdynia (PL); Zoltan Fodor, Swindon (GB)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 16/129,318

(22) Filed: Sep. 12, 2018

(65) Prior Publication Data

US 2019/0042484 A1    Feb. 7, 2019

(51) Int. Cl.
*G06F 13/10* (2006.01)
*G06F 13/00* (2006.01)

(52) U.S. Cl.
CPC .... *G06F 13/102* (2013.01); *G06F 2213/0026* (2013.01)

(58) Field of Classification Search
CPC .............................. G06F 13/00; G06F 2213/00
USPC ............................................................ 710/14
See application file for complete search history.

(56) References Cited

U.S. PATENT DOCUMENTS

| 2014/0369214 | A1* | 12/2014 | Jinsong | H04L 43/50 370/252 |
| 2015/0178235 | A1* | 6/2015 | Kanigicherla | G06F 13/4027 710/314 |
| 2015/0195765 | A1* | 7/2015 | Bhardwaj | H04W 40/02 370/338 |
| 2015/0334051 | A1* | 11/2015 | Fang | H04L 49/102 370/401 |
| 2019/0041458 | A1* | 2/2019 | Koki | H05K 1/0245 |
| 2019/0042484 | A1* | 2/2019 | Fornal | G06F 13/102 |
| 2019/0190727 | A1* | 6/2019 | LaBosco | H04L 12/40045 |

* cited by examiner

*Primary Examiner* — Christopher B Shin
(74) *Attorney, Agent, or Firm* — Compass IP Law, PC

(57) ABSTRACT

Examples include connecting an external physical layer device to a media access control device by determining a mode of a communications link between the external physical layer device and the media access control device; and when the mode of the communications link is serial gigabit media independent interface (SGMII), enabling an inter-integrated circuit (I2) interface between the external physical layer device and the media access control device, and setting a destination for management data input/output (MDIO) transactions to the external physical layer device.

20 Claims, 7 Drawing Sheets

CONNECTING AN EXTERNAL PHY DEVICE TO A MAC DEVICE USING A MANAGEMENT DATA INPUT/OUTPUT INTERFACE

BACKGROUND

The Open Systems Interconnection (OSI) model is a conceptual framework that characterizes and standardizes the communication functions of a telecommunications or computing system without regard to its underlying internal structure and technology. The model partitions a communication system into abstraction layers.

The physical layer (PHY) is responsible for transmission and reception of unstructured raw data between a device and a physical transmission medium. Layer specifications define characteristics such as voltage levels, timing of voltage changes, physical data rates, maximum transmission distances, and physical connectors. This includes the layout of pins, voltages, line impedance, cable specifications, signal timing and frequency for wireless devices. The components of a physical layer can be described in terms of a network topology. An example of a protocol using the physical layer is Ethernet (as defined by the Institute of Electrical Electronics Engineers (IEEE) 802.3 standard described at standards.ieee.org).

The data link layer provides node to node data transfer—a link between two directly connected nodes. It defines the protocol to establish and terminate a connection between two physically connected devices. It also defines the protocol for flow control between them. In one example, the IEEE 802.3 Ethernet standard divides the data link layer into two sublayers: a) medium access control (MAC) layer—responsible for controlling how devices in a network gain access to a medium and permission to transmit data; and b) logical link control (LLC) layer—responsible for identifying and encapsulating network layer protocols, and controls error checking and frame synchronization.

In some cases there are difficulties in connecting external PHY devices to a MAC device (such as an Ethernet network interface controller (NIC) for example). One approach is to integrate the PHY device into the MAC device (called an internal PHY approach). However, this approach introduces various limitations on capabilities that are delivered by the PHY modules. Significantly, the internal PHY approach provides no ability to switch to a different, more suitable PHY device (for example in terms of better supported connections, better supported temperature range, and so on).

Another approach is to use an external PHY device but with a connection over a serializer/deserializer (SERDES) interface. A SERDES interface includes a pair of functional blocks commonly used in high speed communications to compensate for limited input/output. These blocks convert data between serial data and parallel interfaces in each direction. The primary use of a SerDes is to provide data transmission over a single line or a differential pair in order to minimize the number of I/O pins and interconnects. In this approach the connection to the external PHY device is achieved with the use of an integrated circuit that is capable of converting parallel data into the data's serial equivalent and vice versa. Unfortunately, some external PHY devices do not support a SERDES connection. Thus, a better approach is needed.

DETAILED DESCRIPTION

Embodiments of the present invention disclose an improved device driver for a network I/O device (such as an Ethernet NIC for example) to successfully establish full link up functionality for a hardware configuration including one or more external PHY devices using a management data I/O (MDIO) interface. In an embodiment, the full link up functionality provides the ability to send and receive audio visual bridge (AVB) packets according to the IEEE 802.1 BA standard (known as the IEEE Standard for Local and Metropolitan Area Networks—Audio-Visual Bridging (AVB) System, available at www.ieee802.org/1/pages/802.1ba.html).

Figure 1:
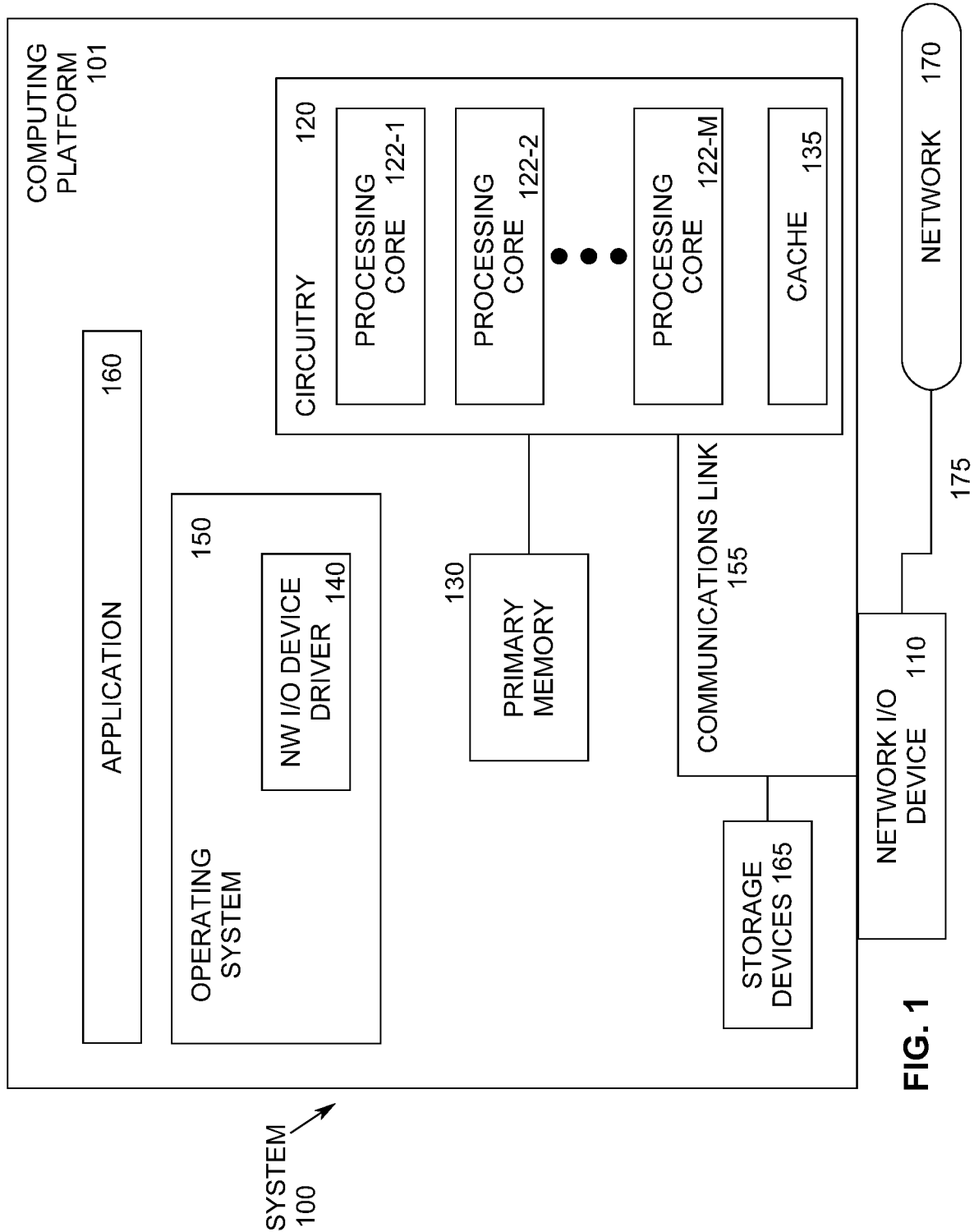
FIG. 1 illustrates an example computing system.

FIG. 1 illustrates an example computing system 100. As shown in FIG. 1, computing system 100 includes a computing platform 101 coupled to a network 170 (which may be the Internet, for example). In some examples, as shown in FIG. 1, computing platform 101 is coupled to network 170 via network communication channel 175 and through network I/O device 110 (e.g., a network interface controller (NIC)) having one or more ports connected or coupled to network communication channel 175. In an embodiment, network communication channel 175 includes a PHY device (now shown). In an embodiment, network I/O device 110 is an Ethernet NIC. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, network (NW) I/O device driver 140, operating system (OS) 150, at least one application 160, and one or more storage devices 165. In one embodiment, OS 150 is Linux™. In another embodiment, OS 150 is Windows® Server. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a peripheral component interface express (PCIe) bus conforming to version 3.0 or other versions of the PCIe standard published by the PCI Special Interest Group (PCI-SIG) at pcisig.com. In some examples, operating system 150, NW I/O device driver 140, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-*m*, where "m" is any positive whole integer greater than 2. In an embodiment, OS 150, NW I/O device driver 140, and application 160 are executed by one or more processing cores 122-1 to 122-m.

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 101 is a disaggregated server. A disaggregated server is a server that breaks up components and resources into subsystems. Disaggregated servers can be adapted to changing storage or compute loads as needed without replacing or disrupting an entire server for an extended period of time. A server could, for example, be broken into modular compute, I/O, power and storage modules that can be shared among other nearby servers. In an embodiment, computing platform 101 is an infotainment system resident in a vehicle (e.g., an automobile, a truck, a motorcycle, etc.), a ship, an aircraft, or a spacecraft.

Circuitry 120 having processing cores 122-1 to 122-m may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

Figure 2:
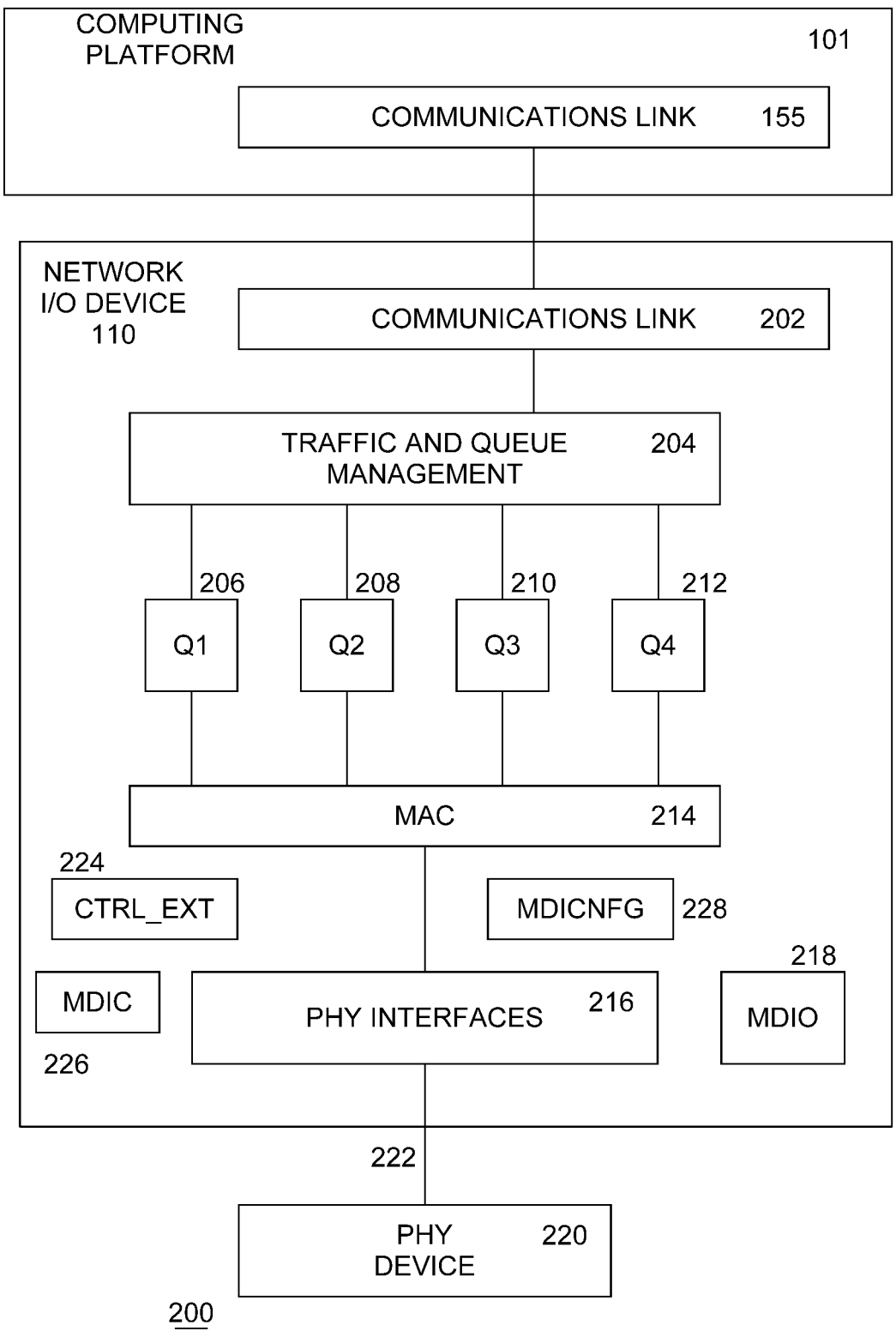
FIG. 2 illustrates an example network I/O device.

FIG. 2 illustrates an example network I/O device 110. On the host side, network I/O device 110 connects to computing platform 101 by communications link 155 (e.g., a PCIe bus). On the network side, network I/O device 110 connects to PHY device 220 which forms at least a part of network communications channel 175 shown in FIG. 1. PHY device 220 is any circuitry to implement physical layer functions for networking. A PHY device connects a link layer device network I/O device 110) to a physical medium such as an optical fiber or a copper cable. A PHY device typically includes both physical coding sublayer (PCS) and physical medium dependent (PMD) layer functionality. A PHY chip (also known as a PHYceiver and embodied in PHY device 220) is commonly found in Ethernet devices. One purpose of PHY device 220 is to provide analog signal physical access to the link, PHY device 220 is used in conjunction with a Media Independent Interface (MII) 222 communications fink or interfaced to a microcontroller that takes care of the higher layer functions. When PHY device 220 is an Ethernet PHY chip, PHY device implements the hardware send and receive functions of Ethernet frames. PHY device 220 interfaces between the analog domain of Ethernet's line modulation and the digital domain of link-layer packet signaling.

MII 222 is defined as a standard interface to connect a Gigabit Ethernet (MAC) block to a PHY chip. The III is defined by IEEE 802.3 (available at standards.ieee.org) and connects different types of PHYs to MACs. Being media independent means that different types of PHY devices for connecting to different media (i.e., twisted pair, fiber optic, etc.) can be used without redesigning or replacing the MAC hardware (i.e., network I/O device 110). Thus, any MAC may be used with any PHY, independent of the network signal transmission media. The ME can be used to connect a MAC to an external PHY using a pluggable connector, or directly to an internal PHY chip which is on the same printed circuit board (PCB).

Management Data I/O (MDIO) 218 serial bus circuitry is associated with the MII that is used to transfer management information between MAC and PHY components. At system power up, using auto-negotiation, the PHY device adapts to whatever MAC device it is connected to unless settings are altered via the MDIO interface. A serial gigabit media-independent interface (SGMII) is a variant of MII. It is used for Gigabit Ethernet but can also carry 10/100 Mbit/s Ethernet. In an embodiment, MII 222 comprises a SGMII. SGMII uses differential pairs at 625 MHz clock frequency double data rate (DDR) for transmit (TX) and receive (RX) data and TX and RX clocks. SGMII provides a low-power and low pin-count serial 8b/10b-coded interface. Transmit and receive paths each use one differential pair for data and another differential pair for a clock. The TX/RX clocks must be generated on device output but are optional on device input. In an embodiment MII 222 is a SERDES interface. In an embodiment, MII 222 includes capabilities for both SGMII and SERDES interfaces.

Network I/O device 110 includes communications link 202 circuitry (e.g., PCIe bus circuitry) to communicate with communications link 155 of computing platform 101. Network I/O device 110 includes PHY interfaces circuitry 216 to communication with PHY device 220 over interface 222 (e.g., SGMII in an embodiment). Traffic and queue management circuitry 204 is included to manage the traffic flow of transmitted and received packets. A plurality of queues is included, such as Q1 206, Q2 208, Q3 210, and Q4 212 to store incoming and outgoing packets and associated metadata. In an embodiment, at least one queue is used to store AVB packets. In other embodiments, any number of queues may be used. MAC circuitry 214 is the processing unit within network I/O device 110 to process transmitting and/or receiving packets.

In an embodiment, network I/O device 110 is coupled using SGMII to an external PHY device 220 with the use of a MDIO 218 connection to transmit and receive AVB packets.

In an embodiment, network I/O device 110 includes a plurality of registers, including Extended Device Control Register (CTRL_EXT) 224, Media Dependent Interface Control Register (MDIC) 226, and MDC/MDIO Configuration Register (MDIC) 228.

Figure 3:
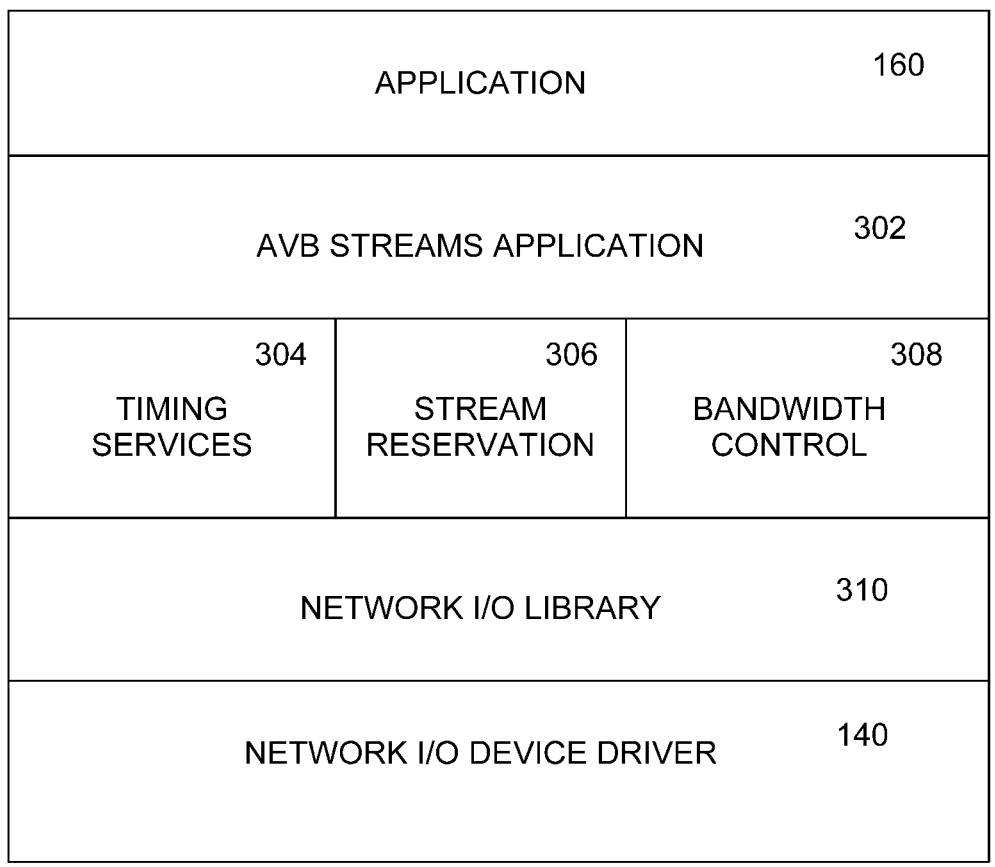
FIG. 3 illustrates an example software stack for network I/O processing.

FIG. 3 illustrates an example software stack 300 for network I/O processing. Application 160 performs any processing desired by a user of the computing platform. In an embodiment, application is an infotainment cockpit program to control and/or manage the operation of one or more functions of a vehicle (e.g., an automobile, a truck, a motorcycle, etc.), a ship, an aircraft, or a spacecraft. In an embodiment, software stack 300 includes an AVB streams application 302 to manage transmitting and receiving of AVB data streams in computing platform 101. In an embodiment, AVB streams application 302 is part of application 160. In another embodiment, AVB streams application 302 is part of OS 150.

Software stack 300 includes at least three components to assist in handling AVB streams. Timing services component 304 synchronizes clocks (not shown) used in computing platform 101 and network 170. In an embodiment, timing services component 304 implements one or more of a Precision Time Protocol (PTP) entitled "Standard for a Precision Clock Synchronization Protocol for Networked Measurement and Control Systems" published in 2008 as IEEE 1588-2008 (available at standards.ieee.org) and IEEE 802.1AS-2011, entitled "Standard for Local and Metropolitan Area Networks—Timing and Synchronization for Time-Sensitive Applications in Bridged Local Area Networks" (part of the IEEE (AVB) group of standards), further extended by the IEEE 802.1 Time-Sensitive Networking (TSN) Task Group). IEEE 802.1AS-2011 specifies a profile for use of IEEE 1.588-2008 for time synchronization over a virtual bridged local area network. In particular 802.1AS-2011 defines how IEEE 802.3 (Ethernet), IEEE802.11 (WiFi), and Multimedia over Coax Alliance (MoCA) implementations can all be parts of the same PTP timing domain.

Stream reservation component 306 implements a stream reservation protocol for an Ethernet implementation. In an embodiment, stream reservation component 306 implements IEEE 802.1Q-2011, entitled "Standard for Local and Metropolitan Area Networks—Virtual Bridged Local Area Networks—Amendment: 9: Stream Reservation Protocol (SRP)" (available at www.ieee802.org/1/pages/802.1at.html). SRP defines the concept of a streams at layer 2 of the OSI model. Stream reservation component 306 provides a mechanism for end-to-end management of the resources of streams to guarantee Quality of Service (QoS).

Bandwidth control component 308 controls time-sensitive, loss-sensitive real-time AV transmissions. In an embodiment, bandwidth control component 308 implements IEEE 802.1 QAV, entitled "IEEE Standard for Local and Metropolitan Area Networks—Virtual Bridged Local Area Networks—Amendment: Forwarding and Queuing Enhancements for Time-Sensitive Streams" (available at www.ieee802.org).

Network I/O library 310 is middleware software that provides low level functions to AVB stream handling application. This should be perceived as a proxy between physical hardware (which is in this case network I/O device 110) and upper-layer software applications 160, so that they are able to communicate with registers, memory regions controlled by network I/O device 110, and so on. At the lowest level of software stack 300 is network I/O device driver 140, which operates and/or controls network I/O device 110. Network I/O device driver provides a software interface to network I/O device 110, enabling OS 150 and application 160 to access network I/O hardware functions without needing to know precise details about how the network I/O device operates. In an embodiment, network I/O device driver 140 is resident in kernel space of OS 150. In another embodiment, one or more of timing services 304, stream reservation 306, bandwidth control 308, network I/O library 310, and network I/O device driver are part of OS 150.

Figure 4:
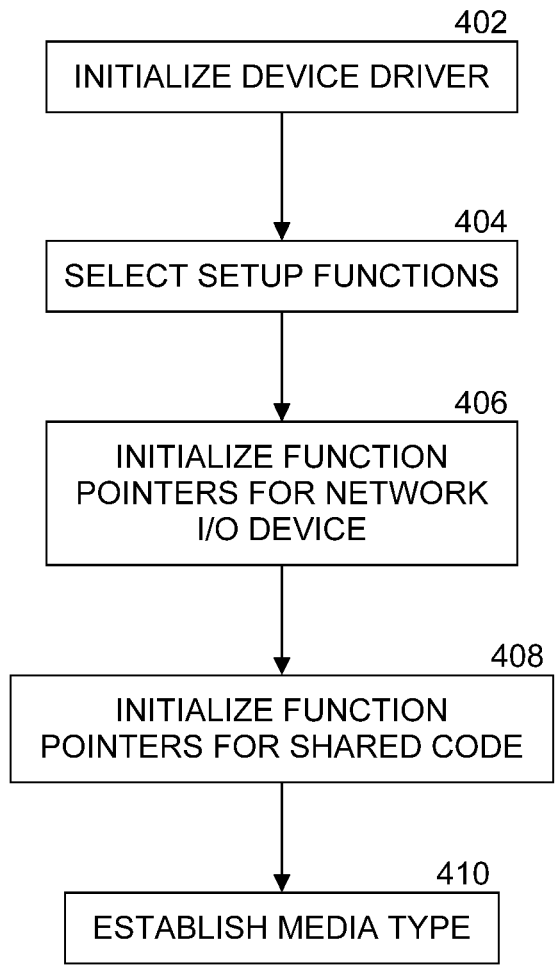
FIG. 4 illustrates an example flow diagram of a process to connect an external PHY device to a MAC device using a Management Data I/O (MDIO) interface.

FIG. 4 illustrates an example flow diagram 400 of a process to connect an external PHY device to a MAC device using a Management Data I/O (MDIO) interface. In an embodiment, flow 400 is implemented as part of network I/O device driver 140. In an embodiment, when OS 150 is Linux™, network I/O device driver 140 is installed as a kernel module in the OS by using an "insert module" (insmod) call to the Linux™ OS. During system initialization of computing platform 101, the OS makes an "I/O control" (ioctl) call, which is being handled by an ioctl handler function inside network I/O device driver 140, to instruct the driver to initialize itself (as shown at block 402). In an embodiment, initialization of the device driver includes actions such as allocating kernel memory, requesting PCIe drive space, notifying PCIe devices of status, setting up to handle interrupts, and so on. At block 404, network I/O device driver 140 selects setup functions. From a driver point of view, this is a step that, depending on the MAC type, chooses which initialization code for function pointers will be used throughout the life span of the network I/O device driver. At block 406, network I/O device driver 140 initializes function pointers for network I/O device 110. At block 408, network I/O device driver 140 initializes functions pointers for shared code. In an embodiment, blocks 406 and 408 are implemented by initializing function pointers to appropriate addresses of method implementations. In this step the network I/O device driver assigns selected physical fragments of code that are specific to network I/O device 110. This includes, for example, ensuring that functions responsible for setting up network I/O device specific non-volatile memory parameters are initialized to appropriate memory addresses (via a function pointers mechanism). Apart from performing this operation, this step initializes pointers that are shared code related; this is necessary for all network I/O devices that implement 1,000 megabyte per second (Mb/s) functionality. In an embodiment, block 406 may be treated as a super-set that incorporates operations done next in block 408. In one scenario, a 1 gigabyte per second (Gb/s) network I/O device driver 140 can be used by a plurality of network I/O devices. As a consequence, generic function pointer calls are scaled down to appropriate fragments of code dedicated for this specific HW configuration. In one embodiment, blocks 404, 406 and 408 are treated as an integral initialization flow (depending on one another) that have been divided into parts for increased clarity of performed operations. At block 410, network I/O device driver 140 establishes a media type for future communication over MII 222. The media type indicates information regarding the characteristics of the interface between the PHY and the MAC.

Figure 5:
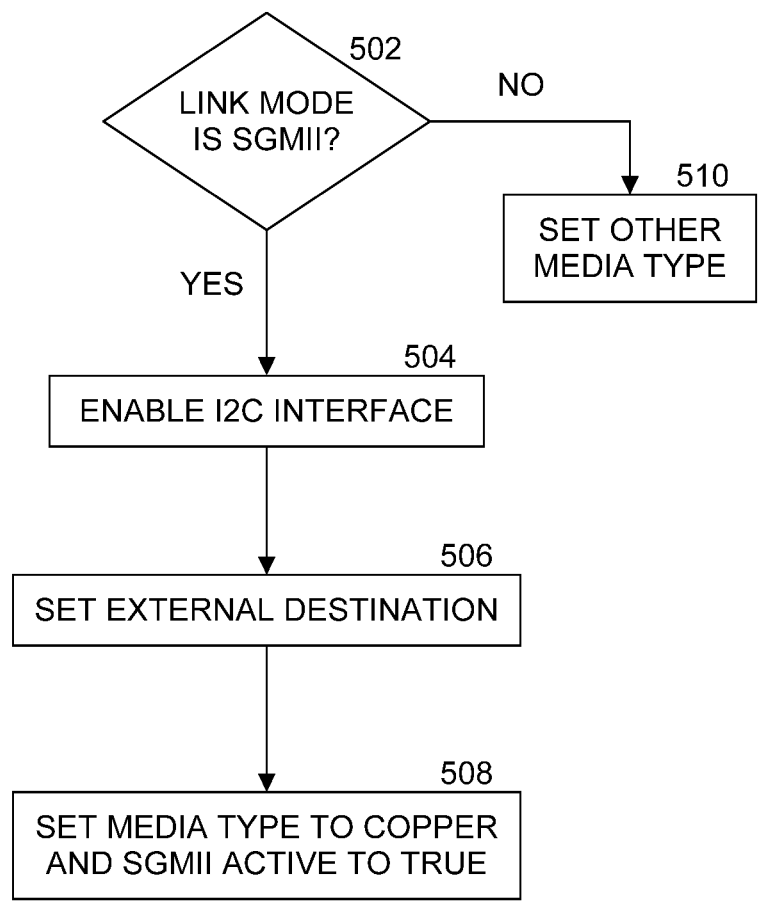
FIG. 5 illustrates an example flow diagram of a process to establish a media type.

FIG. 5 illustrates an example flow diagram 500 of a process to establish a media type. At block 502, if the link mode of MII 222 is not MDIO-based SGMII, then the media type is set to one of a plurality of options depending on the configuration at block 510. In a majority of the cases there is a small form factor pluggable transceiver (SFP) module plugged into the computing platform. This means that the network I/O device driver establishes the appropriate media type based on querying the module itself (through inter-integrated circuit (I2C) read transactions). Depending on the type of transceiver, the media type can be initialized to internal SERDES, copper or unknown in case of detecting an undefined connection that is not supported. Another possibility is in a configuration including I2C-based SGMII.

In this case the same fragment of code as in SERDES is invoked, but with some specific alterations. The media type is set to a copper connection. Within the implementation, the code is diversifying between the two SGMII options, so full clarity is assured. A SERDES connection should be treated as a separate link mode.

SGMII provides two options—internal and external MDIO. Embodiments of the present invention use external MDIO. In an embodiment, the link mode is obtained by reading a value out of CTRL_EXT 224. If the link mode is SGMII (which controls the interface on the communications link between the MAC and the PHY), processing continues with block 504, where network I/O device driver 140 enables the inter-integrated circuit (I2C) interface. The I2C interface is turned on so that network I/O device driver 140 is able to utilize MDIO connection 222 and MDIO circuitry 218 to access external PHY device 220. In an embodiment, this step includes altering the state of CTRL_EXT in register memory space of the network I/O device (referred to as Programming Interface in one embodiment) under offset 0x0018. This requires querying network I/O device 110 for the current value of the CTRL_EXT register and setting bit number 25 (I2C enabled) to 1. At block 506, network I/O device driver 140 sets an external destination, meaning that external Media Dependent Input/Output (MDIO) transactions are utilized to access external PHY device 220 (as opposed to internal MDIO transactions). In an embodiment, this step includes setting bit number 31 in MDICNFG register 228 in network I/O device register memory space to 1. This indicates that MDIO transactions are to be performed with the use of the MDIC interface and are redirected to external PHY device 220 using the MDIO protocol.

In an embodiment, a querying mechanism is implemented within the network I/O device driver to query the MDIC register for available values of a PHY Register Address field and a PHY_Address field within MDICNFG register 228. MDICNFG register 228 is responsible for configuring settings for establishing a correct MDIO connection (which is accessed directly at read/write level by MDIC register 226). This is used to read out the PHY_ID number for use in device driver initialization processing. In an embodiment when OS 150 is Linux™, the printk( ) mechanism is used to print out the desired information into a Linux™ terminal under "dmesg".

An example pseudo code for this querying mechanism is below.

```
FOR phy_address = 0; phy_address < number_of_phy_addresses;
phy_address++
  <Write value of "i" into PHYADD field of MDICNFG register under
0x0E04 offset>
    FOR reg= 0; reg < number_of_phy_registers; reg++
      <Shift left by 16bits reg value AND set MDI register into READ
      mode>
      <Write the above value into MDIC register>
        <Read the MDIC register after 50 usec delay performed in a
        loop>
        If (mdic_value & MDIC_READY_BIT)
        break;
        printk (mdic_value)
```

In an embodiment, a module parameter specifying the PHY_Address to be used while loading the network I/O device driver is introduced. A MODULE_PARAM_DESC macro defined in Linux™ enables the feature. The argument, specified by the user loading the network I/O device driver module into the OS, is then used in the initialization processing of the device driver.

Sudo insmod device_driver PHY_Addr=<specified_PHY_Address>

At block 508, network I/O device driver 140 sets the media type variable to copper and sets a SGMII active variable to true as actions ending the establishing media type flow. From now on the network I/O device driver knows that operations with the external PHY device are in SGMII mode over MDIO. Further actions include cooperating between the MAC and PHY in the process of achieving full link up functionality by network I/O device 110 or exchanging general information in the process of receiving/transmitting data between the MAC and PHY devices.

Figure 6:
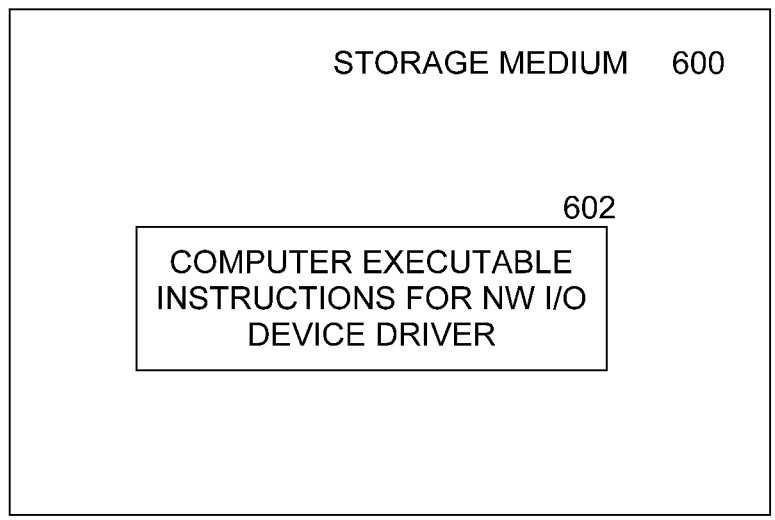
FIG. 6 illustrates an example of a storage medium.

FIG. 6 illustrates an example of a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions 602 to implement logic flows 400 and 500 of FIG. 4 and FIG. 5, respectively. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
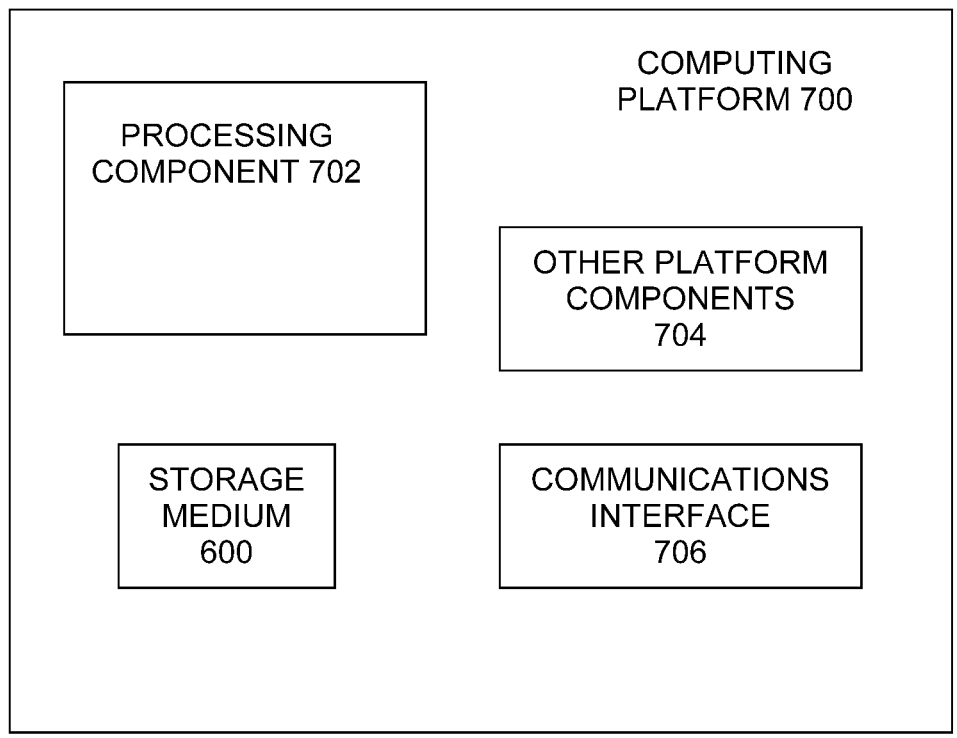
FIG. 7 illustrates another example computing platform.

FIG. 7 illustrates an example computing platform 700. In some examples, as shown in FIG. 7, computing platform 700 may include a processing component 702, other platform components 704 and/or a communications interface 706. In an embodiment, computing platform 700 is an infotainment system resident in a vehicle (e.g., an automobile, a truck, a motorcycle, etc.), a ship, an aircraft, or a spacecraft.

According to some examples, processing component 702 may execute processing operations or logic for instructions stored on storage medium 600. Processing component 702 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 704 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 706 may include logic and/or features to support a communication interface. For these examples, communications interface 706 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 700, including logic represented by the instructions stored on storage medium 600 may be implemented using any combination of discrete circuitry, ASICs, logic gates and/or single chip architectures. Further, the features of computing platform 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining a mode of a communications link between an external physical layer device and a media access control device; and
   when the mode of the communications link is serial gigabit media independent interface (SGMII), enabling an inter-integrated circuit (I2) interface between the external physical layer device and the media access control device, and setting a destination for management data input/output (MDIO) transactions to the external physical layer device.

2. The method of claim 1, comprising setting a media type to copper when the mode is SGMII.

3. The method of claim 1, comprising setting a SGMII active variable to true when the mode is SGMII.

4. The method of claim 1, comprising performing MDIO transactions between the external physical layer device and the media access control device in SGMII mode using an MDIO protocol when the mode is SGMII.

5. The method of claim 1, wherein the media access control device comprises an Ethernet network interface controller (NIC).

6. The method of claim 1, comprising sending audio video bridge (AVB) packets between the external physical layer device and the media access control device.

7. At least one tangible machine-readable medium comprising a plurality of instructions that in response to being executed by a processing system cause the processing system to:
   determine a mode of a communications link between an external physical layer device and a media access control device; and
   when the mode of the communications link is serial gigabit media independent interface (SGMII), enable an inter-integrated circuit (I2) interface between the external physical layer device and the media access control device, and set a destination for management data input/output (MDIO) transactions to the external physical layer device.

8. The at least one tangible machine-readable medium of claim 7, comprising instructions to set a media type to copper when the mode is SGMII.

9. The at least one tangible machine-readable medium of claim 7, comprising instructions to set a SGMII active variable to true when the mode is SGMII.

10. The at least one tangible machine-readable medium of claim 7, comprising instructions to control performing MDIO transactions between the external physical layer device and the media access control device in SGMII mode using an MDIO protocol when the mode is SGMII.

11. The at least one tangible machine-readable medium of claim 7, wherein the media access control device comprises an Ethernet network interface controller (NIC).

12. The at least one tangible machine-readable medium of claim 7, comprising instructions to control sending of audio video bridge (AVB) packets between the external physical layer device and the media access control device.

13. A processing system comprising:
   a network input/output (I/O) device coupled to at least one external physical layer device; and
   a network I/O device driver to determine a mode of a communications link between the network I/O device and the at least one external physical layer device; and
   when the mode of the communications link is serial gigabit media independent interface (SGMII), to enable an inter-integrated circuit (I2) interface between the external physical layer device and the network I/O device, and to set a destination for management data input/output (MDIO) transactions to the external physical layer device.

14. The processing system of claim 13, comprising the network I/O device driver to set a media type to copper when the mode is SGMII.

15. The processing system of claim 13, comprising the network I/O device driver to set a SGMII active variable to true when the mode is SGMII.

16. The processing system of claim 13, wherein the network I/O device comprises MDIO circuitry to perform MDIO transactions between the external physical layer device and the network I/O device in SGMII mode using an MDIO protocol when the mode is SGMII.

17. The processing system of claim 13, wherein the network I/O device comprises an Ethernet network interface controller (NIC) having media access control circuitry.

18. The processing system of claim 13, comprising an operating system including the network I/O device driver.

19. The processing system of claim 18, wherein the operating system is Linux™.

20. The processing system of claim 16, comprising the network I/O device to control sending of audio video bridge (AVB) packets between the external physical layer device and the network I/O device.

* * * * *